July 9, 1940.          B. L. DOLBEAR          2,207,244
DIRECTION FINDER CORRECTING LOOP
Original Filed May 22, 1935
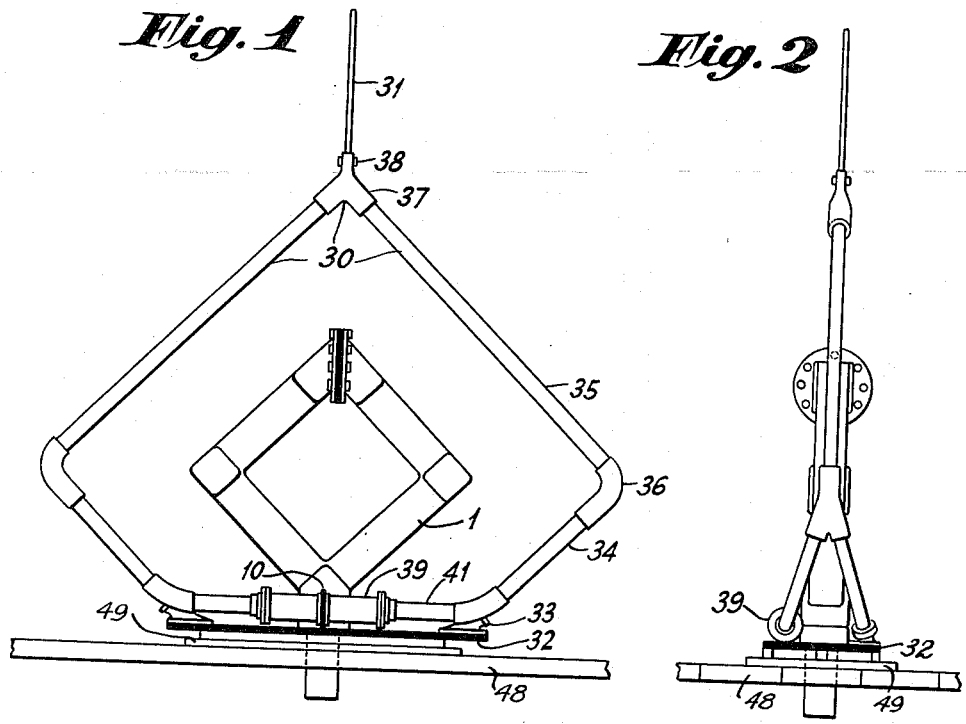
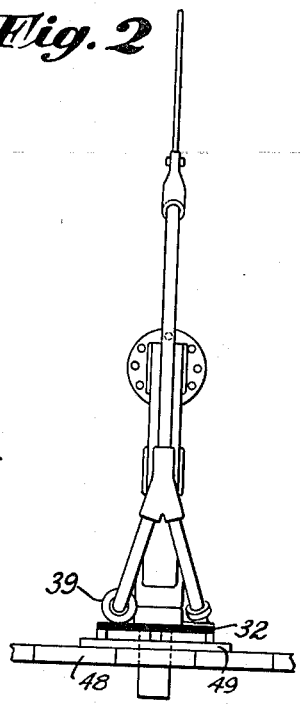
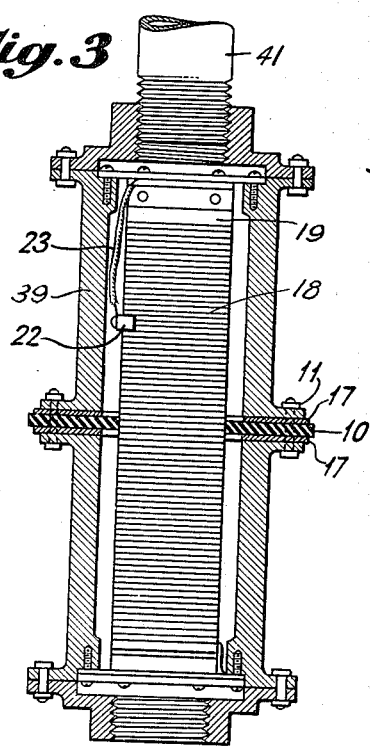
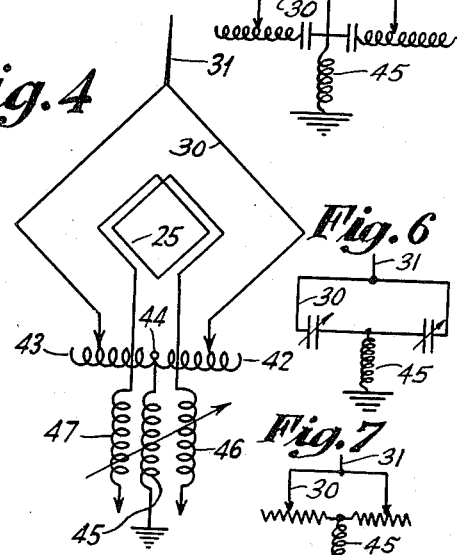
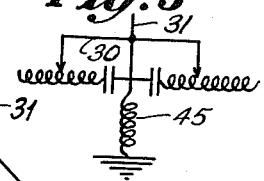
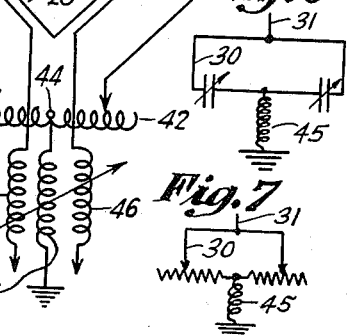
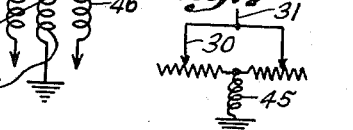
INVENTOR
BENJAMIN L. DOLBEAR
BY
ATTORNEY Patented July 9, 1940

2,207,244

UNITED STATES PATENT OFFICE 2,207,244

DIRECTION FINDER CORRECTING LOOP

Benjamin L. Dolbear, Belmont, Mass., assignor to Radio Corporation of America, a corporation of Delaware Original application May 22, 1935, Serial No. 22,715, now Patent No. 2,137,273, dated November 22, 1938. Divided and this application July 29, 1937, Serial No. 156,265

4 Claims. (Cl. 250—11)

This invention is a divisional application of my copending application Serial No. 22,715, filed May 22, 1935, Patent No. 2,137,273, dated Nov. 22, 1938, and relates to a new and improved radio direction finder loop with compensating means for correcting or reducing loop errors, and it is particularly adapted to aircraft and marine use.

An object of this invention is to provide a new and novel arrangement for loop compensation whereby the structure for the correcting of the quadrantal error in bearings is closely associated with the rotatable loop structure.

Another object of this invention is to provide a rigid waterproof structure for use with a rotatable waterproof and/or metallic shielded loop.

A further object of this invention is the novel method of combining a radio direction finder correcting loop with the balancing and sense antenna in such a manner that the sense antenna will be symmetrically arranged with respect to the rotatable loop.

A feature of this invention is the arrangement of the component parts whereby the correcting loop serves to provide a suitable housing for compensating devices associated with the rotatable direction finder loop.

The use of compensating or correcting metallic members, generally in the form of a wire conductor surrounding or placed adjacent to a direction finder loop, is well known in the prior art. However, such arrangements do not always provide a practical marine or aircraft installation due to mechanical injury to small fragile parts or physical displacement by weather conditions or many other causes encountered by aircraft or marine vessels. Furthermore, in a radio direction finder, it is sometimes found desirable to use a vertical antenna or its equivalent in conjunction with a loop antenna to balance out residual voltages in the loop circuit at null areas, as well as to produce unilateral effects for determining the sense of bearings obtained. A more effective open wire antenna is accomplished by locating a metallic member symmetrically with respect to the direction finder rotatable loop, although in many instances of aircraft and marine installation it is located off to one side of the rotatable loop structure.

It is one of the purposes of my invention to combine the correcting loop and the open antenna in such a manner that they both will be symmetrically located with respect to the rotatable loop. Likewise, in combining the correcting loop and the open antenna, I propose to include within a suitably enclosed waterproof housing various compensating impedance elements such as variable inductances, variable capacitances or variable resistances, or a combination of such elements.

This novel correcting loop may be used in addition to the well-known forms of mechanical compensators of the cam type, to provide further and improved correction of errors, or in some cases may be in place of the cam type compensator.

This invention will be more fully understood by referring to the accompanying drawing, in which:

Fig. 1 is a front elevation of a correcting loop which is combined with a symmetrically arranged open antenna;

Fig. 2 is a side view of Fig. 1;

Fig. 3 is a detail of the lower portion of Figs. 1 and 2, showing the housing for the compensating elements;

Fig. 4 is a diagram of the correcting loop having combined open antenna and the variable compensating elements showing how it is associated with the rotatable loop;

Fig. 5 is a diagram showing the compensating impedance elements as a combination of an inductance and a capacitance;

Fig. 6 is a diagram showing the compensating impedance elements as variable condensers; and Fig. 7 is a diagram showing the compensating impedance elements as variable resistances.

In the modification shown by Figs. 1, 2, 3 and 4, the rotatable loop 1 is surrounded by a rigid waterproof metallic loop correcting member 30 which has combined at its apex a vertical open antenna 31 in the form of a metallic rod or wire having any suitable length. The combined correcting loop and open antenna are supported on an insulating sub-base 32 upon which is located a plurality of supporting feet 33 for securing and locating the tubular members and fittings of correcting loop 30. A lower tubular member 34 is joined to an upper tubular member 35 by means of an elbow fitting 36. Sub-base 32 is secured slightly above the normal base or craft deck 48, which is generally of metallic material, by suitable spacing members 49. The upper portion of the correcting loop is provided with a Y-shaped fitting 37 in which the tubes 35 and the open antenna are joined, the open antenna 31 being fastened to the member 37 by means of a bolt 38. Upon the sub-base 32 and located at one side of the rotatable loop 1, there is a metallic housing 39 which is mechanically connected to the supporting feet 33 by means of tubular members 41. An insulated joint is included in this housing. The general arrangement and construction of the variable compensating elements located within this housing is similar to that of the modification shown in the parent application, except that mid-tap is included in the winding which is carried down to the receiver for balancing or sense indications.

Fig. 3 shows in detail how housing 39 is electrically subdivided by an insulating joint comprising an insulated ring 10 interposed between the subdivided halves which are provided with flanges having apertures through which a plurality of bolts 11 pass for clamping members 10 and 39 together. To prevent entry of moisture within the housing, there is provided suitable gasket material 17, which is located between the flange of housing 39 and ring 10. The compensating inductive elements 42 and 43 are wound on an insulating tube 19 with wire 18, the ends of which in turn are mechanically secured to the flanges on ends of housing 39. To vary the inductance of the compensating element, there is provided a variable tap 22 with a flexible lead 23, and although an inductive element is shown in Fig. 3 as being located within housing 39, there may be substituted therefor such compensating elements as a variable resistance, a variable capacitance, or a combination thereof.

The circuit diagram Fig. 4 shows an open antenna 31 directly connected to the correcting loop 35 and joined with suitable taps to each of the compensating elements 42 and 43, and is centrally connected at a point 44. From this point it is connected to a coupling coil 45, usually located in the receiver, and is variably coupled with the loop coupling coils 46 and 47 for purposes of balancing or sense indications.

This invention should not be limited to the modification shown, as other forms will readily suggest themselves to those skilled in the art.

What is claimed is:

1. A radio direction finder antenna comprising an insulating base member, a rotatable loop having a vertical shaft passing through said base member, a tubular metallic correcting loop member following the contour of a major portion of said rotatable loop, the lower portion of said tubular metallic member being branched out and joined by two supporting members each having two separate arms extending downward to support said tubular metallic member on said base member, a metallic housing located between adjacent arms of said two supporting members, said housing being divided at the central position therebetween by an insulating separation member to break the electrical continuity of said correcting loop member, and a variable impedance element electrically connected in series between the divided portions of said metallic housing to vary the electrical value of said correcting loop member.

2. A radio direction finder antenna comprising an insulating base member, a rotatable loop having a vertical shaft passing through said base member, a tubular metallic correcting loop member following the contour of a major portion of said rotatable loop, the lower portion of said tubular metallic member being branched out and joined by two supporting members each having two separate arms extending downward to support said tubular metallic member on said base member, two of said separate arms being separated at the central position therebetween by an insulating separation member to break the electrical continuity of said correcting loop member, a variable impedance element electrically connected in series between the separated arms to vary the electrical value of said correcting loop member, and an auxiliary antenna symmetrically located at the top of said tubular correcting loop member.

3. A radio direction finder antenna comprising an insulating base member, a rotatable loop having a vertical shaft passing through said base member, a tubular metallic correcting loop member following the contour of a major portion of said rotatable loop, the lower portion of said tubular metallic member being branched out and joined by two supporting members each having two separate arms extending downward to support said tubular metallic member on said base member, a metallic housing located between adjacent arms of said two supporting members, said housing being divided at the central position therebetween by an insulating separation member to break the electrical continuity of said correcting loop member, a variable impedance element electrically connected in series between the divided portions of said metallic housing to vary the electrical value of said correcting loop member, and a mid-point tap on said variable impedance element for coupling to a direction finder receiver.

4. A radio direction finder antenna comprising an insulating base member, a rotatable loop having a vertical shaft passing through said base member, a tubular metallic correcting loop member following the contour of a major portion of said rotatable loop, the lower portion of said tubular metallic member being branched out and joined by two supporting members each having two separate arms extending downward to support said tubular metallic member on said base member, two of said separate arms being separated at the central position therebetween by an insulating separation member to break the electrical continuity of said correcting loop member, a variable impedance element electrically connected in series between the separated arms to vary the electrical value of said correcting loop, a mid-point tap on said variable impedance element for coupling to a direction finder receiver, and an auxiliary antenna symmetrically located at the top of said tubular correcting loop member.

BENJAMIN L. DOLBEAR.